(12) United States Patent
Krenz

(10) Patent No.: US 7,777,747 B1
(45) Date of Patent: Aug. 17, 2010

(54) HANDHELD BIRD IDENTIFICATION TOOL WITH GRAPHICAL SELECTION OF FILTER ATTRIBUTES

(76) Inventor: Charles Krenz, 80 Joaquin Rd., Portola Valley, CA (US) 94028

( * ) Notice: Subject to any disclaimer, the term of this patent is extended or adjusted under 35 U.S.C. 154(b) by 694 days.

(21) Appl. No.: 11/334,996

(22) Filed: Jan. 18, 2006

Related U.S. Application Data

(60) Provisional application No. 60/646,013, filed on Jan. 22, 2005.

(51) Int. Cl.
  *G06F 15/00* (2006.01)
  *G06T 1/00* (2006.01)
(52) U.S. Cl. ............. 345/501; 345/619; 707/999.107
(58) Field of Classification Search ............. 345/619, 345/501; 707/101
See application file for complete search history.

(56) References Cited

U.S. PATENT DOCUMENTS

| | | | | |
|---|---|---|---|---|
| 6,222,449 | B1* | 4/2001 | Twining | 340/539.11 |
| 6,546,368 | B1* | 4/2003 | Weninger et al. | 704/270 |
| 7,363,309 | B1* | 4/2008 | Waite et al. | 707/101 |
| 7,377,233 | B2* | 5/2008 | Patton | 119/712 |
| 7,454,334 | B2* | 11/2008 | Agranat | 704/231 |
| 7,496,228 | B2* | 2/2009 | Landwehr et al. | 382/170 |
| 2002/0152225 | A1* | 10/2002 | Kevan et al. | 707/104.1 |
| 2003/0026484 | A1* | 2/2003 | O'Neill | 382/224 |
| 2005/0049877 | A1* | 3/2005 | Agranat | 704/270 |
| 2007/0041645 | A1* | 2/2007 | Ruff, Jr. | 382/224 |

OTHER PUBLICATIONS

RSPB, Easy, automated bird identification tool from the RSPB, Wildlife Extra.com, pp. 1-13.*
http://web.archive.org/web/20051013072346/http://identify.whatbird.com/mwg/_/0/attrs.aspx.*
Percevia—web page at www.perceivia.com; (c) 2002-2005, pp. 1-3; Printed from internet on Jan. 18, 2006.
Percevia, "Wireless Pocket PC Tour", web pages at www.perceivia.com/Wireless_Pocket_PC_Tour.htm (c) 2002-2005, pp. 1-10; Printed from internet on Jan. 18, 2006.
Percevia, "Technical Details", web pages at www.perceivia.com/Technical_Details.htm (c) 2002-2005, pp. 1-7; Printed from internet on Jan. 18, 2006.
"Birds of North America", web pages at http://identify.whatbird.com/mwg/_/0/attrs.aspx (c) 2002-2005, pp. 1-2; Printed from internet on Jan. 18, 2006.

(Continued)

*Primary Examiner*—M Good Johnson
(74) *Attorney, Agent, or Firm*—Treyz Law Group; G. Victor Treyz; David C. Kellogg

(57) ABSTRACT

A handheld bird identification tool is provided that assists users in identifying birds based on field observations. A user desiring assistance in classifying a bird uses interactive on-screen options to create a set of bird identification filter attributes. An interactive graphical view of a bird may be used to assign appearance characteristics such as color, pattern, and shape attributes to selected anatomical regions. The appearance characteristics and other filter attributes may be used as query terms in searching a bird identification database. A user may review audio clips of bird songs and images of birds matching the filter attributes. The bird identification tool may be used to manage a user's life list. Images, audio clips, and field notes may be gathered using the bird identification tool.

20 Claims, 21 Drawing Sheets

OTHER PUBLICATIONS eNature, "FieldGuides", web pages at www.enature.com/home/ (c) 2005, pp. 1-2; Printed from internet on Jan. 18, 2006.

eNature, "HandheldGuide to Birds", web pages at www.enature.com/handheld (c) 2005, p. 1; Printed from internet on Jan. 18, 2006.

eNature.com, "HandheldGuide to Birds—eNature.com", web pages at enature.com website dated Nov. 24, 2004 printed from internet archive at http://web.archive.org/web/20041124/113926/www.enature.com/handheld/ on Jan. 18, 2006.

* cited by examiner

| | | | | | | |
|---|---|---|---|---|---|---|
| SPECIES | GENUS | PLUMMMAGE | DATE | GPS | LOCATION | NOTES |
| | | | | | | |
| | | | | | | |
| | | | | | | |

FIG. 20

HANDHELD BIRD IDENTIFICATION TOOL WITH GRAPHICAL SELECTION OF FILTER ATTRIBUTES

This application claims the benefit of provisional patent application No. 60/646,013, filed Jan. 22, 2005, which is hereby incorporated by reference herein in its entirety.

BACKGROUND

This invention relates to computer-based tools for assisting birdwatchers, and more particularly, to handheld tools with interactive graphical capabilities for identifying birds and managing bird lists.

It is often desirable to be able to identify birds. Ornithologists and hobbyist birdwatchers typically use printed guides to assist in identifying birds. When a birder identifies a bird that he or she has not seen before, he or she may manually add the bird to the birder's life list.

Bird guides implemented on handheld computers have been developed to assist birders in making identifications. Conventional bird guides of this type are useful, but use a text-driven format that can be difficult to use.

It would therefore be desirable to be able to provide improved handheld bird identification tools with graphical control and list management capabilities.

SUMMARY

In accordance with the present invention, a handheld bird identification tool is provided. The bird identification tool can be used to assist a user in the field in properly identifying an observed bird. The user can interact with graphical information displayed by the handheld tool.

The user can select a bird type using horizontal arrows. Illustrative bird types that may be selected include heron, duck, shore bird, gull, bird of prey, and land bird. When a desired bird type has been selected, the user can select a desired bird view for that bird type using vertical arrows. For example, after selecting the bird type "gull," the user can select from a body view, head view, underside view, and topside view. Selecting a desired bird type and desired view for that bird type causes the bird identification tool to display appropriate interactive bird anatomical regions for the user.

The user selects a desired anatomical region from the interactive bird anatomical regions in the displayed bird view. For example, if the user has observed that the bird has a striped flank, the user may click on a flank anatomical region displayed in a body view of the bird. The user is then presented with a set of available characteristics (e.g., spotted, striped, etc.) from which the user assigns an appropriate characteristic to the bird's flank. The characteristics assigned to the bird's anatomical regions are used as bird identification filter attributes.

Bird identification filter attributes such as the geographical region in which the observation is being made, the time of year in which the observation is being made, the type of habitat in which the observation is being made, the bird's gender and age, and other suitable criteria may also be specified by the user using the bird identification tool.

After obtaining a set of bird identification filter attributes from the user, the bird identification tool searches a bird identification database. The results of this search include a set of birds that match the user's filter attributes. The user can review the search results to determine which bird has been observed. Search results typically include a graphical image of each bird, text describing each bird, and audio clips of each bird's songs.

A user may use the bird identification tool to capture audio clips and images. Observation notes may also be gathered using the tool. After a bird has been identified correctly, the user may use the tool to add the bird to the user's day list and life list.

Further features of the invention, its nature and various advantages will be more apparent from the accompanying drawings and the following detailed description.

BRIEF DESCRIPTION OF THE DRAWINGS

FIG. 20 is a diagram showing an illustrative format that may be used for displaying the contents of a user's day list or life list in accordance with the present invention.

DETAILED DESCRIPTION

The present invention relates to software-based tools for identifying birds. Such tools are implemented by loading and running software on computing equipment.

A bird identification tool in accordance with the present invention may be implemented using any suitable hardware platform. For example, a bird identification tool in accordance with the present invention may be implemented using a personal computer such as a notebook or tablet computer. Portable bird identification tools can be easily transported into the field, so portability is advantageous. With one suitable arrangement, which is described herein as an example, the hardware platform on which the bird identification software is implemented is small enough to be carried in an individual's hand. Hardware platforms of this type include cellular telephones and personal digital assistants and are sometimes referred to as handheld computers, handheld computing devices, etc.

Figure 1:
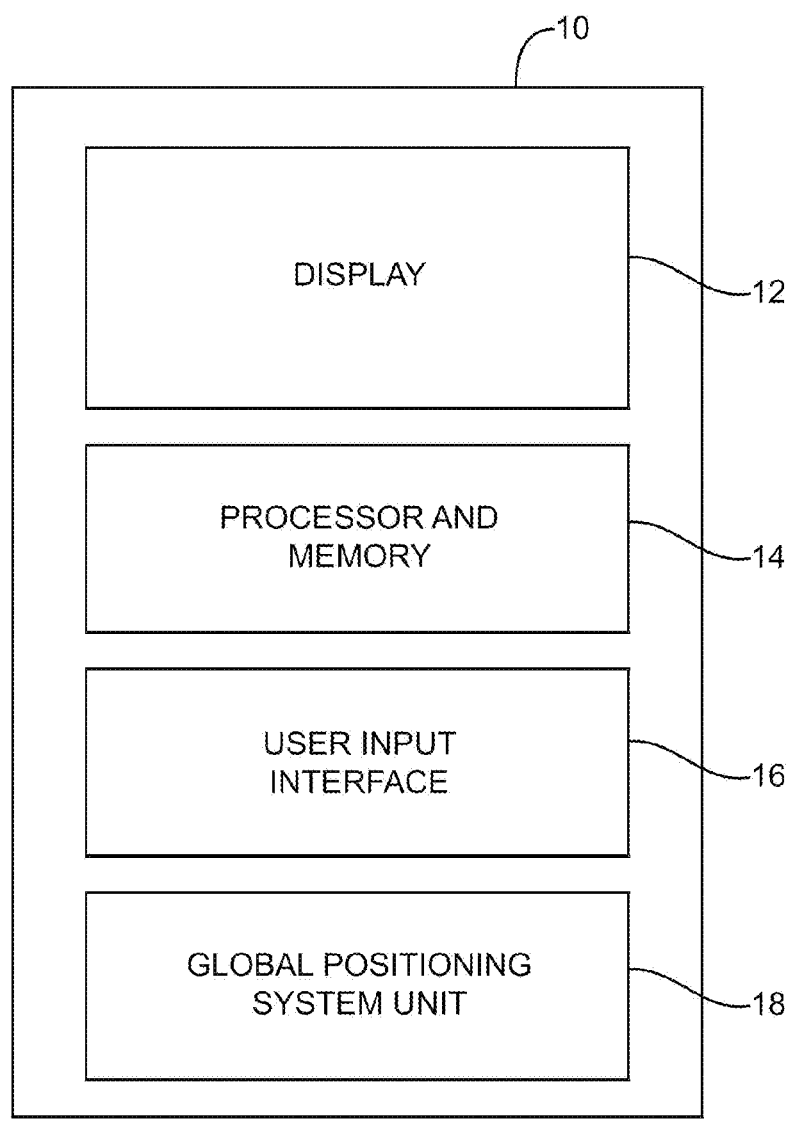
FIG. 1 is a diagram of an illustrative handheld computer on which a bird identification tool may be implemented in accordance with the present invention.

Illustrative hardware components associated with a bird identification tool are shown in FIG. 1. As shown in FIG. 1, handheld computing device 10 has a display 12. Display 12 may be a liquid-crystal display (LCD) or any other suitable display. Display 12 may be a touch-screen that receives user input when a user taps (clicks) on a portion of the display (e.g., using a pen or a finger). Processor and memory 14 may include one or more microprocessors, microcontrollers, digital signal processors, or other processing integrated circuits, and memory such as flash memory, random-access memory, hard drive memory, etc.

User input interface 16 may include general-purpose and dedicated buttons and indicator lights (e.g., for displaying status information). Interface 16 may include a touchpad, a pointing stick, a microphone, a digital camera, or any other suitable data input device. A microphone may be used for audio input and a speaker may be used for audio output. Text, graphics, and video may be displayed for the user on display 12. A virtual keyboard may be formed on a touch-screen display 12 to allow a user to enter desired text strings by making appropriate taps. Other suitable user input arrangements that may be used include those that allow users to enter text using handwriting recognition, to supply input by voice recognition, by typing on an physical keyboard, by capturing a digital image using a digital camera in user input interface 16, etc.

Global positioning system unit 18 may be used to gather geographic information on the current location of device 10.

Figure 2:
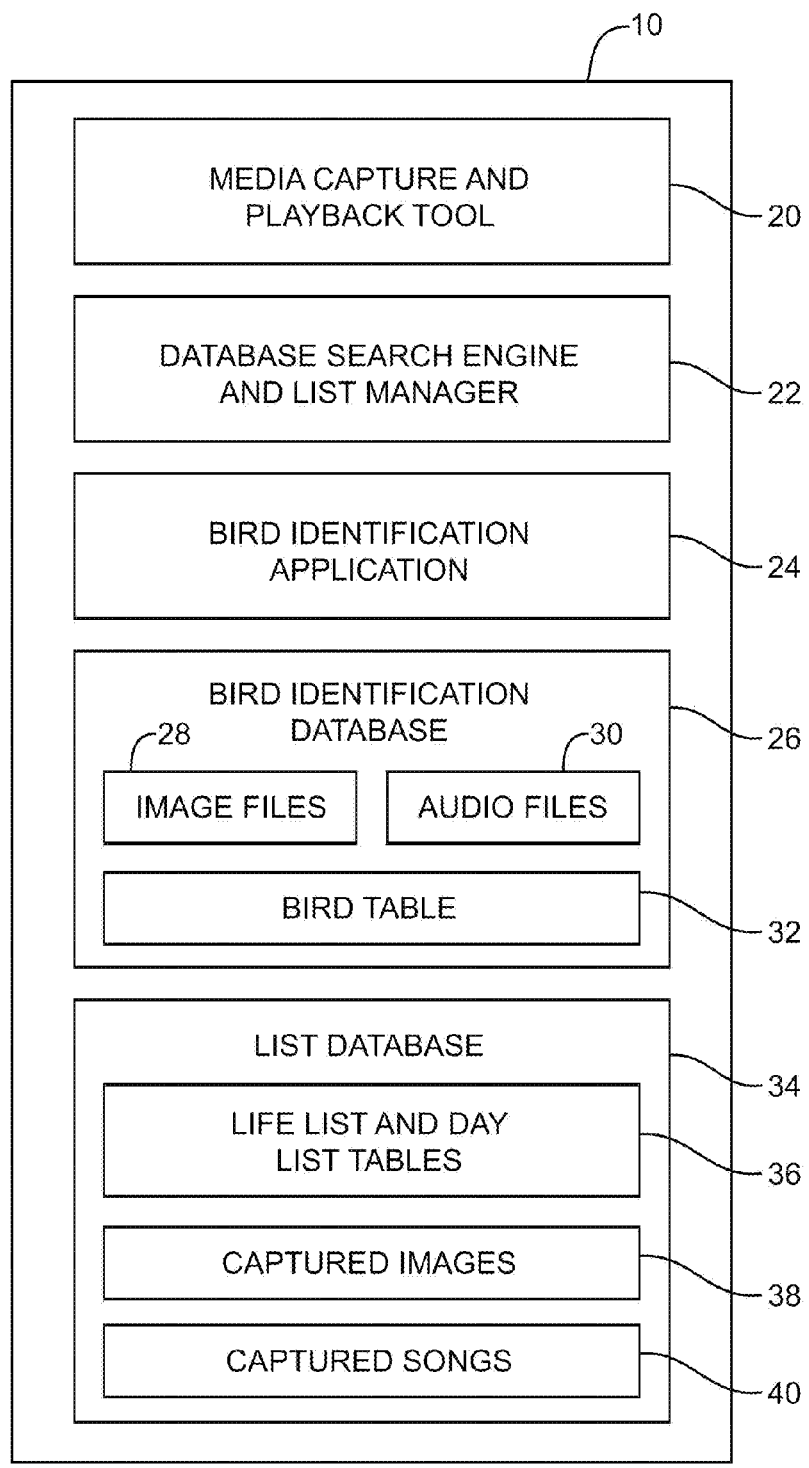
FIG. 2 is a diagram showing software components associated with an illustrative bird identification tool in accordance with the present invention.

Illustrative software components that are associated with the bird identification tool and which may be implemented on a hardware platform such as handheld computing device 10 are shown in FIG. 2. As shown in FIG. 2, the bird identification tool may be based on a bird identification application 24. Application 24 may invoke other tools and interact with database information to provide bird identification and list management functions to a user.

For example, application 24 may invoke media capture and playback tool 20 when it is desired to capture an audio clip of a bird song in the field or when it is desired to play back a call or song from a library. Tool 20 may also be used to support operations related to image capture and playback and video capture and playback.

As another example, bird identification application 24 may call database search engine and list manager 22 when it is desired to search for a bird that matches a set of user-supplied filter attributes or when it is desired to add a bird to the user's life list.

Tools such as tools 20 and 22 may be implemented using one or more software components. If desired, some or all of the functionality of tools 20 and 22 may be implemented using operating system functions. Some or all of the capabilities of tools 20 and 22 may also be implemented as part of bird identification application 24.

The bird identification tool uses a bird identification database 26 to identify birds based on filter attributes. Some filter attributes such as global-positioning system (GPS) coordinates and time and date information may be gathered automatically by application 24 (e.g., using GPS unit 18 of FIG. 1 and an internal clock in device 10). Other filter attributes are based on user-supplied input (e.g., the particular shape of a bird's bill). Based on these attribute inputs, the bird identification tool can search database 26 for a possible match. The database search is performed on the birds listed in bird table 32. Image files 28 and audio files 30 may be associated with bird table entries.

In general, any suitable architecture may be used for database 26. With one suitable arrangement, the rows in table 32 correspond to different birds and to different bird plumage variations. There may be one or more images 28 and audio files 30 associated with each entry. For example, if there are two plumage variations for a particular type of sparrow, the table 32 may include two rows for that sparrow. Images 28 may include several images corresponding to the first plumage variation and several images corresponding to the second plumage variation. There may be one or more songs and/or calls associated with each plumage variation that are stored as audio files 30 in database 26.

The contents of database 26 is generally accumulated by an authoritative source (e.g., a bird guide publisher). By electronically searching the contents of database 26, a user can quickly identify a bird of interest from a few known attributes.

As an example, consider a user in the field who observes an unknown bird. The user observes that the bird has a striped flank and a red crest. The user enters these anatomical attributes and performs a database search on bird identification database 26. The results of the database search can be presented as a list, as a set of annotated images, or in any other suitable format. By reviewing the birds in the search results, the user can identify the bird.

After a bird has been positively identified by the user, the user can add the bird to list database 34. For example, the user can use the bird identification tool to make an appropriate entry in the user's day list and/or life list. The day list and life list may, for example, be stored in corresponding day list and life list tables 36 in list database 34. The user can use the digital camera capabilities of user input interface 16 (FIG. 1) and the microphone and analog-to-digital audio capture capabilities of user input interface 16 (FIG. 1) to capture and store images 38 and songs 40. As an example, the user can capture an image of the bird and store this image as an entry (or in association with an entry) in the user's life list. As another example, if the bird is singing, the user can capture an audio clip of the bird's song. The captured audio clip can be used to annotate the user's life list. If desired, the user can include notes (e.g., notes on the observed behavior of the bird). By using observation notes, captured digital images, and captured audio clips, the user's sighting of the bird can be effectively documented.

The bird identification tool preferably supports a graphical input format. With this type of approach, a user can click (tap) on an anatomical region of interest on a displayed representation of a bird. After specifying an anatomical region of interest in this way, the user can assign attributes to the specified region. For example, the user can assign a particular color or pattern characteristic to the anatomical region.

During typical user interactions with the bird identification tool, a series of screens are displayed for the user on display 12 of FIG. 1. The display 12 is preferably touch sensitive, so the user can interact directly with options displayed on the screens.

Figure 3:
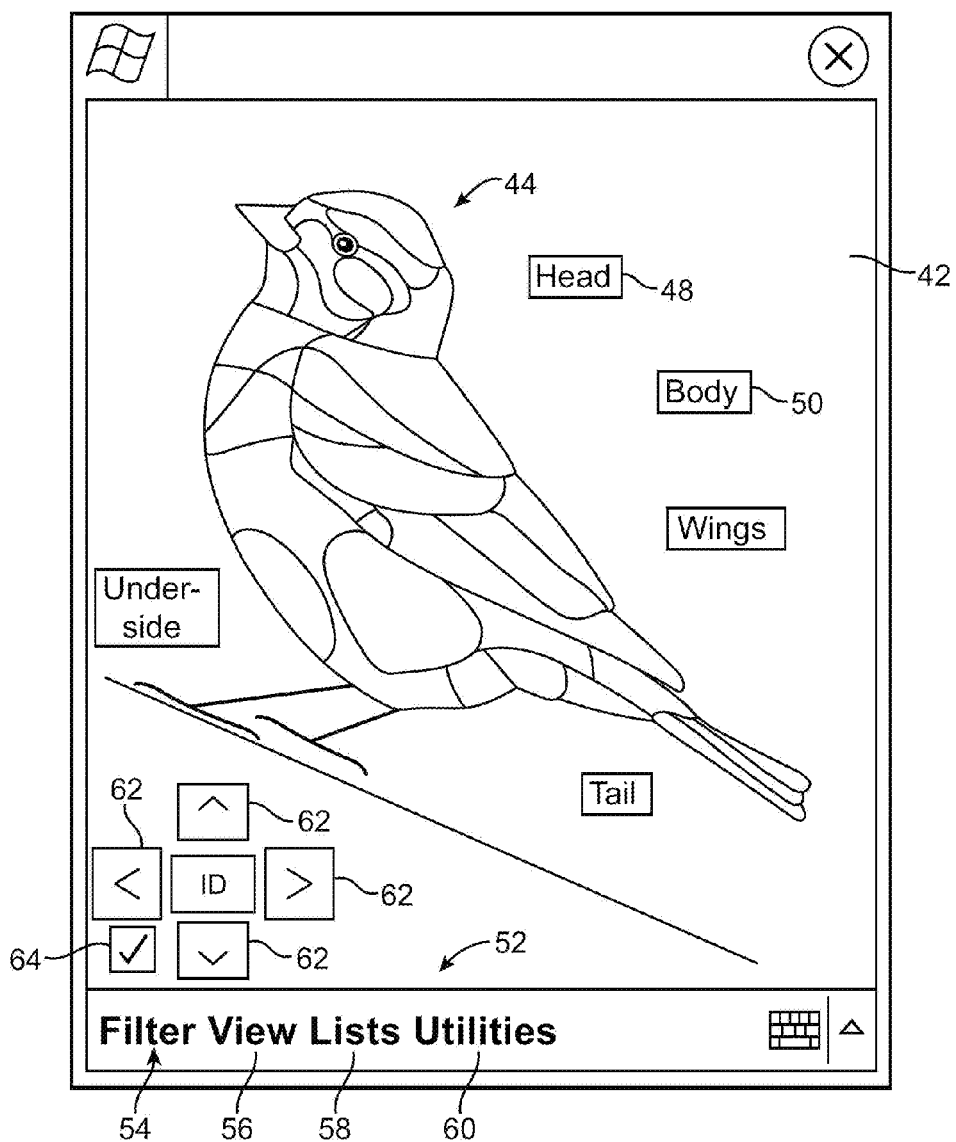
FIG. 3 is an illustrative graphical image of a body view of a bird that may be provided by a bird identification tool in accordance with the present invention.

An illustrative representation of a bird that may be provided for the user by the bird identification tool is shown in FIG. 3. The screen 42 of FIG. 3 contains a bird drawing 44 that is divided into anatomical regions (e.g., bill, flank, etc.). Some anatomical regions contain multiple subregions. For example, the head of the bird is made up of a number of smaller head subregions. In this type of situation, clickable text-box options such as head option 48 and body option 50 may be displayed. If a user desires to select a particular subregion of the head, the user can use a pointing device or finger to tap on the desired subregion (e.g., an eye region). If, however, the user desires to select the entire head, the user clicks on head label option 48.

Options 52 provide the user with high-level access to the functions of the bird identification tool. In the example of FIG. 3, there are four displayed options. This is, however, merely illustrative. Different types of options and different user interface arrangements may be used for controlling the bird identification tool if desired. The use of the options arrangement shown in FIG. 3 is described as an example.

Filter option 54 is used in connection with specifying filter attributes (e.g., anatomical region attributes such as beak shape, flank color, location, etc.). The specified attributes are used as database query terms and allow the user to search the bird database for a possible match.

View option 56 is used to select a desired format in which to view database search results. Option 56 may, for example, be used to specify that search results be presented in the form of a filtered list, a series of rendered images, or a series of drawings. The type of format used to display birds in the bird identification tool is generally not critical. For example, birds may be represented using captured digital pictures, rendered graphical images, line drawings, etc. In certain screens, it may be desirable to use a simpler format than others. For example, it is generally preferable to represent birds generically on attribute selection screens using line drawings of the type shown in FIG. 3. Nevertheless, the use of a line drawing format for the attribute selection screen is optional. Accordingly, the term "images" is sometimes used to collectively refer to these various representational formats, any of which that can be used by the bird identification tool to display a bird.

Lists option 58 may be used to access tool options that relate to viewing information in list database 34 such as the user's day list and life list. Option 58 may, for example, be used to access a recorded song clip or observation notes.

Utilities option 60 may be used to access a help function and functions related to synchronizing the contents of databases such as database 34 with other databases (e.g., a list database on the user's desktop personal computer).

The user may check box 64 to direct the bird identification tool to use the selected filter attribute that is entered using screen 42 when filtering database 26 (FIG. 1). If box 64 is unchecked, only the other filter attributes that have been defined will be included as database query terms.

Horizontal and vertical arrows 62 may be used to navigate to other screens. Arrows 62 may be selected by pressing on corresponding keys on the handheld computing device or by clicking on the arrows 62 directly.

Right and left arrows 62 may be used to navigate between various bird types (e.g., land bird, shore bird, etc.). Up and down arrows 62 may be used to select a desired view for a bird of a particular type.

Figure 4:
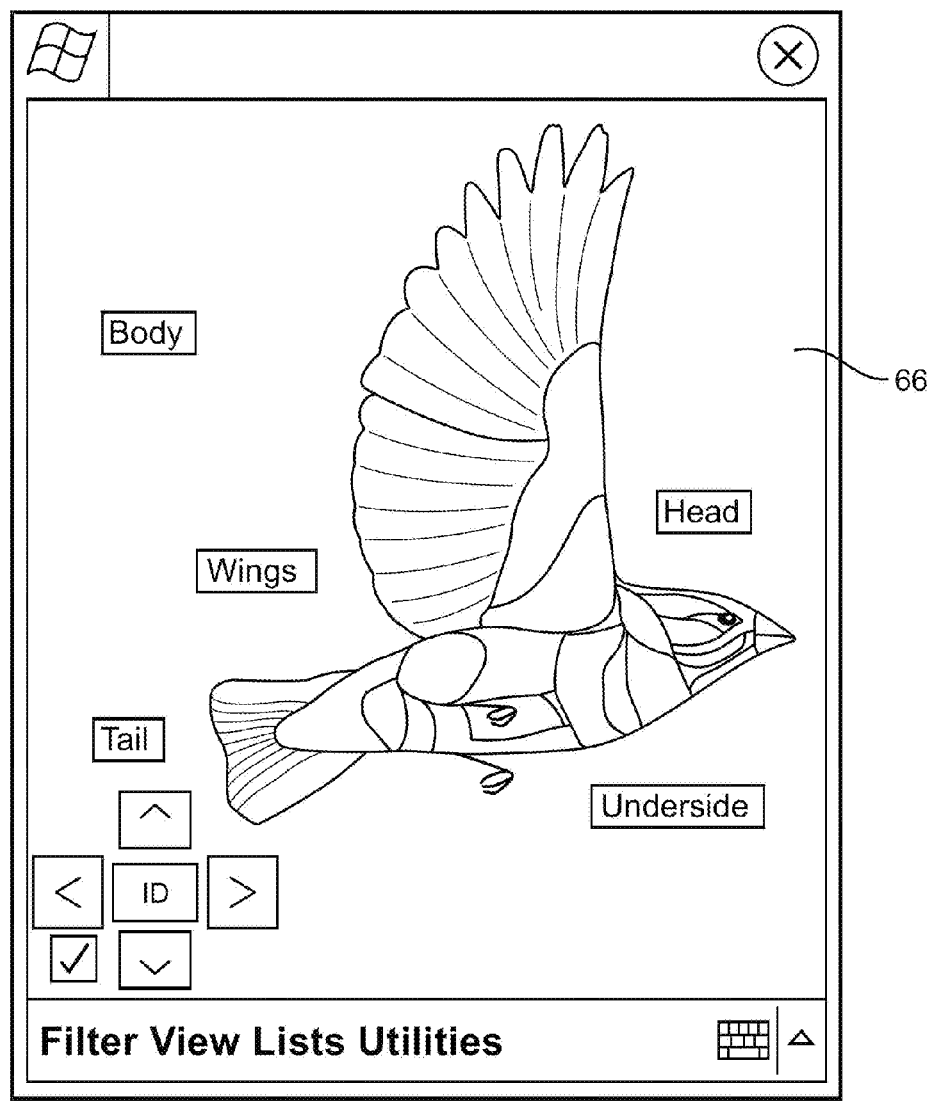
FIG. 4 is an illustrative underside view of a bird that may be provided by a bird identification tool in accordance with the present invention.
Figure 5:
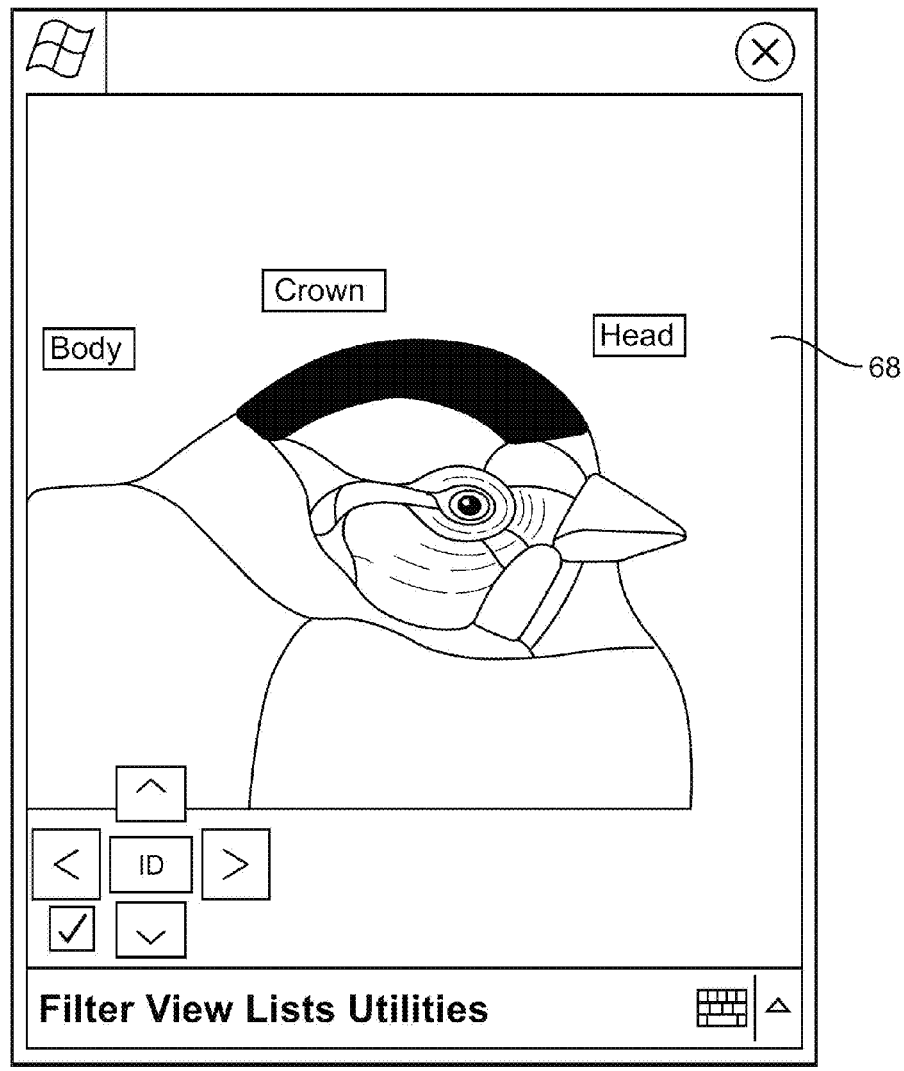
FIG. 5 is an illustrative graphical head view of a bird that may be provided by a bird identification tool in accordance with the present invention.

In the example of FIG. 3, the bird 44 is of the land bird type. The view shown in FIG. 3 is a body view. If the user clicks on up arrow 62, the bird identification tool may display the land bird underwing view of screen 66 in FIG. 4. If the user clicks on down arrow 62, the bird identification tool may display the land bird head view of screen 68 in FIG. 5.

Figure 6:
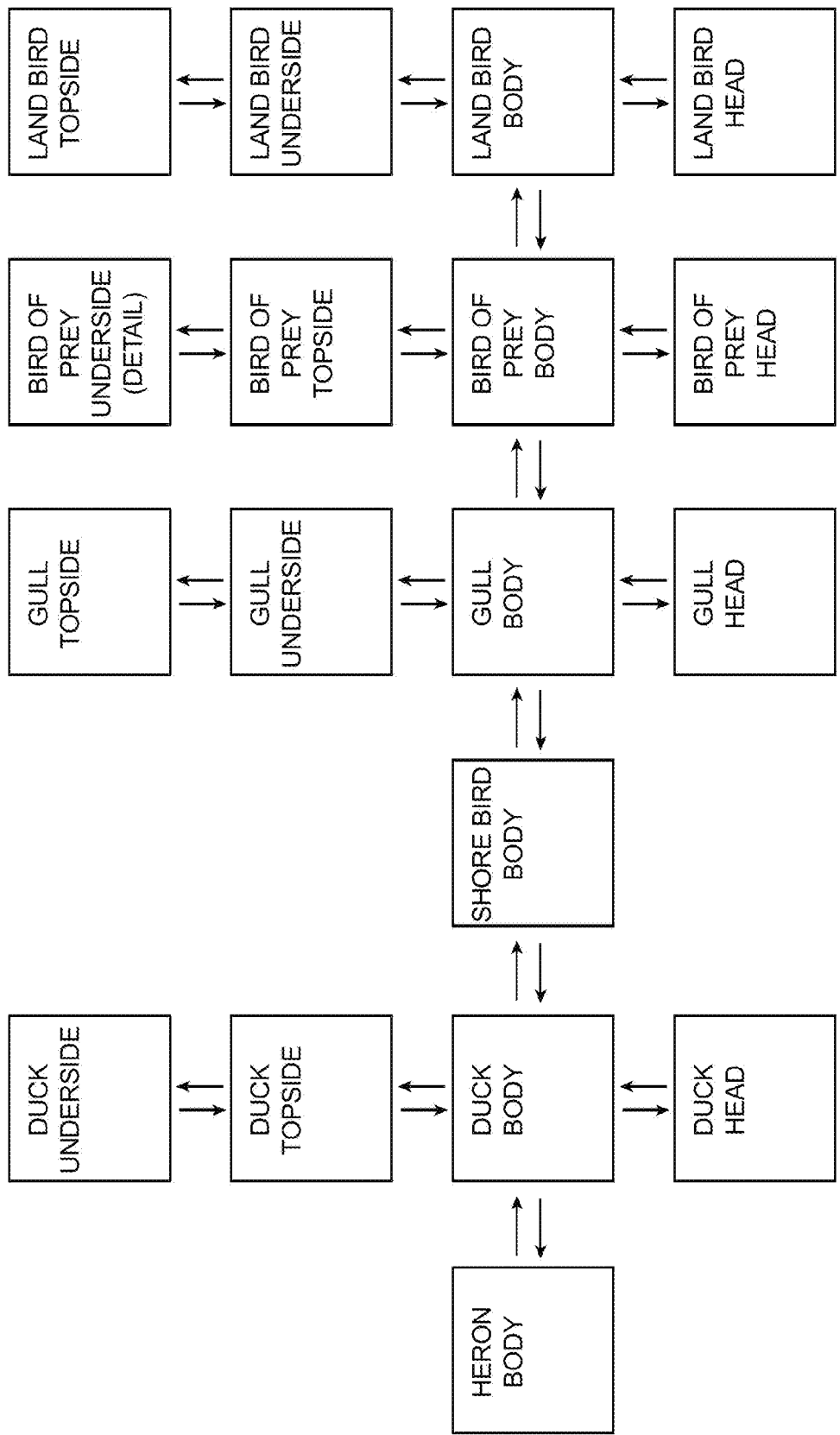
FIG. 6 is a diagram showing how a user of a bird identification tool may navigate between different bird types and views in accordance with the present invention.

There may be any suitable number of supported bird types and any suitable number of views associated with each given bird type. In a typical arrangement there are several bird types and one to four views per type. An illustrative scenario is shown in FIG. 6. An the example of FIG. 6, there are six bird types: heron, duck, shore bird, gull, bird of prey, and land bird. A user can select among theses bird types by clicking on the right and left arrows 62. Some of the bird types have only a single associated view. For example, only the body view of the heron bird type is available for user selection. Other bird types have multiple associated views. The duck bird type, as an example, has four associated views: head, body, topside, and underside. As another example, the bird of prey type has four different associated views: head, body, topside, and underside (in detail). As these examples illustrate, it is not necessary to provide the same views for each bird type. Each bird type may have different associated views. The views are preferably appropriate for each type. For example, it is likely that a bird watcher will observe a bird of prey's underside, because birds of prey typically soar and are often observed from below. In a shorebird, in contrast, this type of underwing detail is not as helpful and may therefore be replaced by a full-bird underside view.

When a user is in the field and spots an unknown bird of interest, the user uses a filter option 54 (FIG. 3) to enter database filter attributes. To enter an anatomical attribute as a filter attribute, the user navigates to an appropriate bird view, as shown in FIG. 6. If, for example, the user can determine that the bird of interest is a land bird, the user navigates to the land bird type. The user then navigates to a suitable view (e.g., the body view of FIG. 3).

After displaying an appropriate bird view, the user selects an anatomical region of interest such as flank region 46 (e.g., by clicking directly on that region). In response, the bird identification tool displays a screen such as screen 70 of FIG. 7.

Screen 70 includes a pop-up window 72 that is used to define the characteristics of the selected anatomical region. The selected anatomical region—"flank" in this example—is listed in region 74. Various different colors are displayed as selectable options 76. The user can select a desired color (e.g., yellow, red, or brown) by clicking on the appropriate option 76. If the user desires to associate a particular pattern with the selected anatomical region, the user may click on an appropriate pattern option 80 ("streaks" in this example). Multiple pattern options 80 may be displayed in window 72 (e.g., streaks, spots, bands) or a drop-down menu or pop-up window arrangement may be used to display pattern options. Clear option 78 may be selected to clear the current color or pattern choice.

Figure 8:
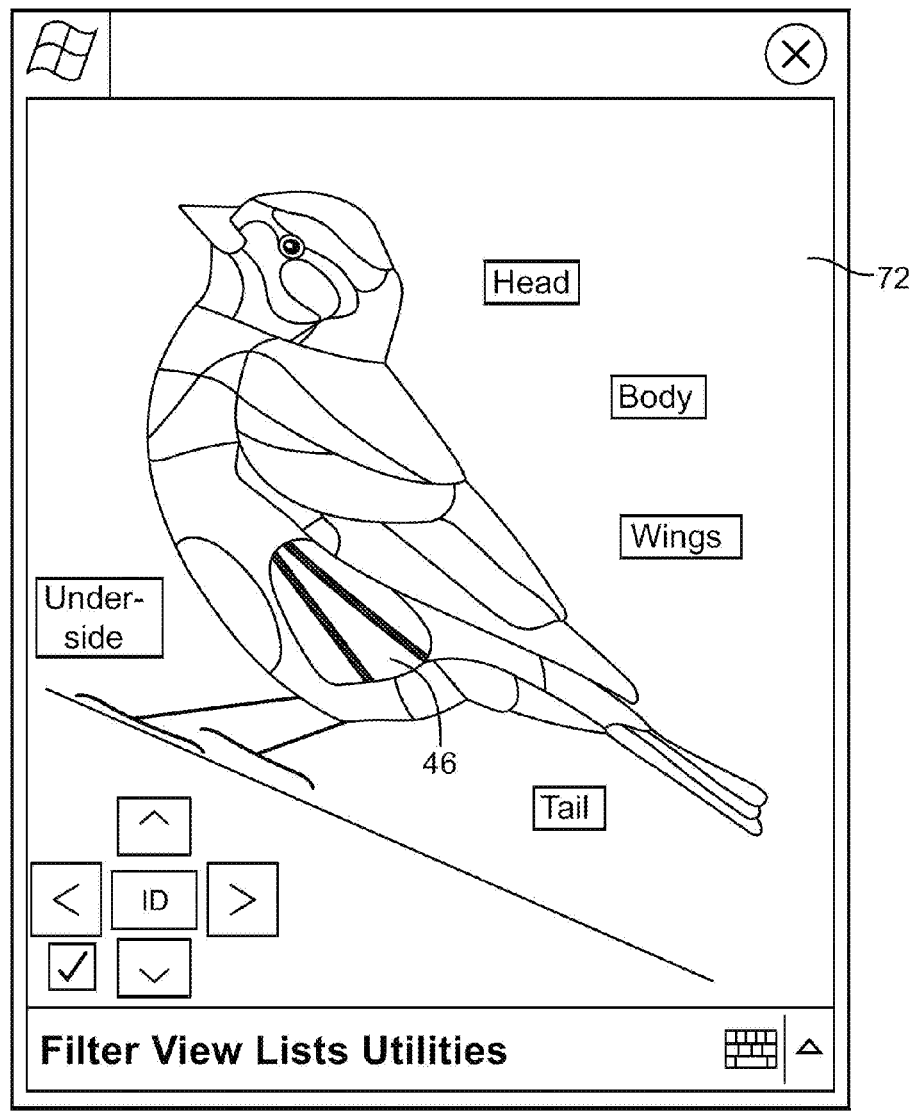
FIG. 8 is a diagram of an illustrative body view of a bird that may be displayed after a user has used options of the type shown in FIG. 7 to specify that a bird of interest has a striped flank in accordance with the present invention.

FIG. 8 shows a screen 72 that may be displayed by the bird identification application after the user has assigned a striped pattern to the anatomical region 46.

Figure 7:
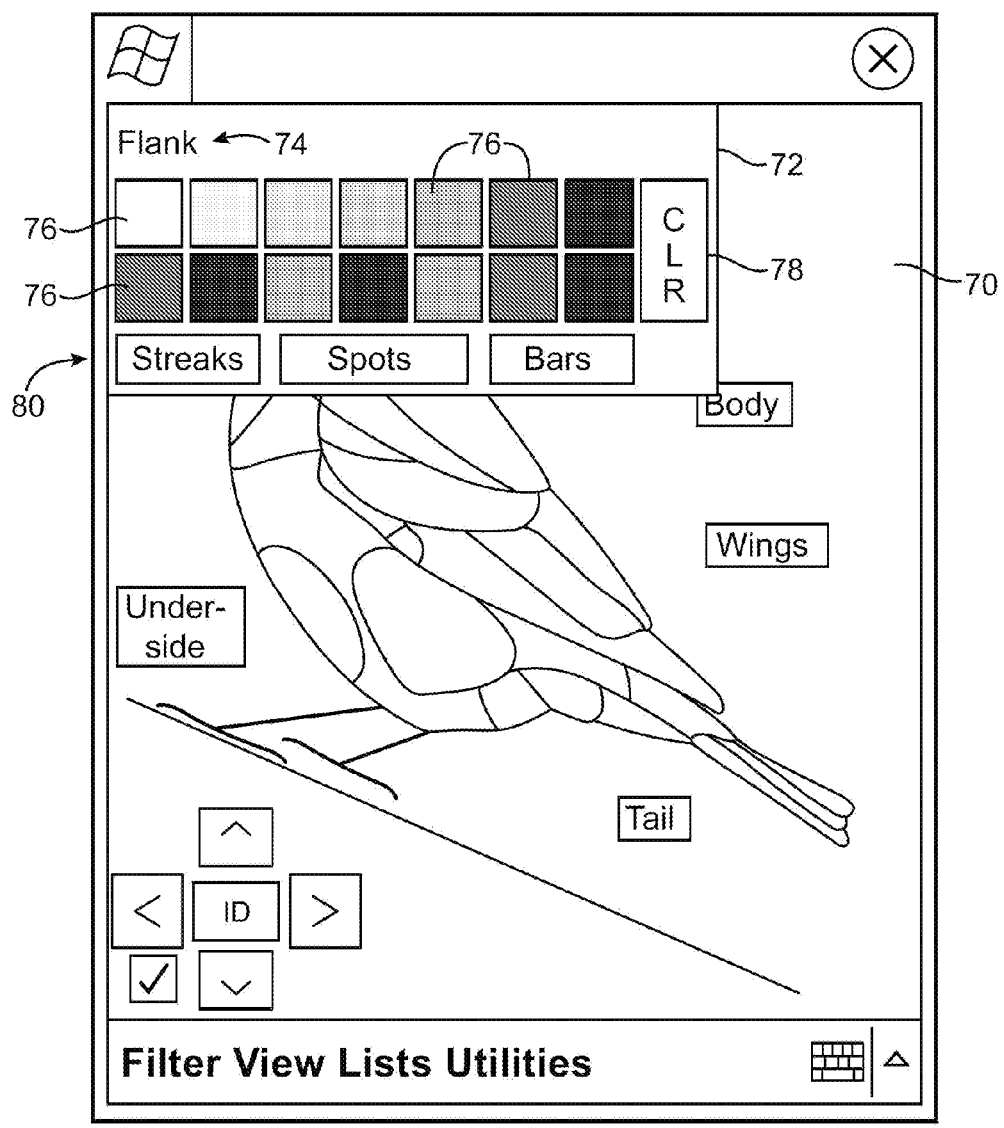
FIG. 7 is a diagram of illustrative color and pattern selection options that may be presented to a user of the bird identification tool upon selecting a desired anatomical region in accordance with the present invention.

The process illustrated in FIGS. 3, 7, and 8 may be repeated if the user is able to observe sufficient detail in the unknown bird. For example, if the user observes that the head of the bird is yellow, the user can click on head label option 48 of FIG. 3 to assign the color yellow to the head region. If the user observes that the breast of the bird is striped, the user can assign a striped pattern to the bird's breast region.

Figure 10:
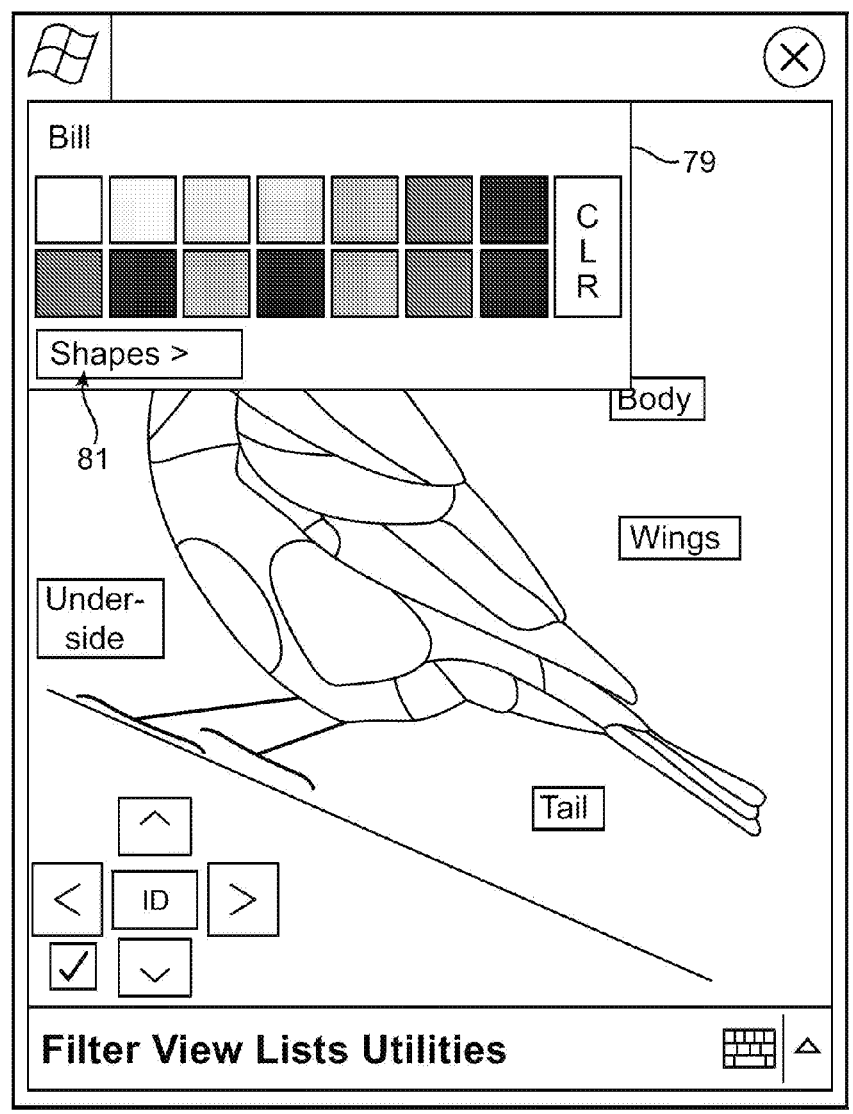
FIG. 10 is a diagram showing how a context-sensitive set of anatomical region options may be presented to a user of the bird identification tool upon selection of an anatomical region such as a bird's bill by clicking on the bill in the view displayed in FIG. 9 in accordance with the present invention.
Figure 11:
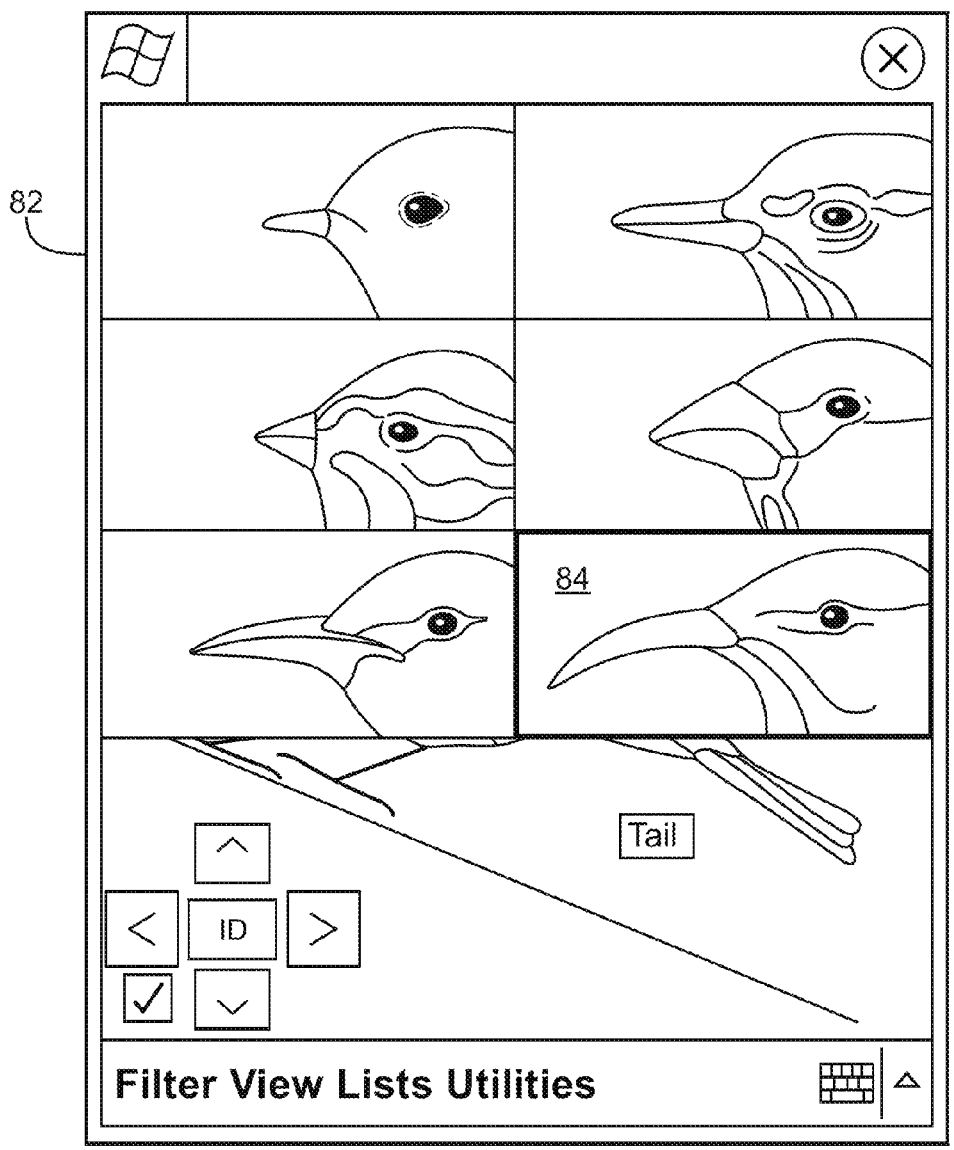
FIG. 11 is a diagram showing how the bird identification tool may present the user with a series of bill shape options from which to select after the user clicks on the bird's bill shape option of FIG. 10 in accordance with the present invention.

The bird identification tool preferably allows users to assign shapes to the anatomical regions of the bird. As an example, if the user is viewing the screen 74 of FIG. 9, the user can click on bill 76. In response, the bird identification tool displays the pop-up window 79 of FIG. 10. If the user selects shapes option 81, the user is presented with shape selection window 82 of FIG. 11. Window 82 contains a number of possible selectable shapes for the bill of the bird. In the example of FIG. 11, the user is selecting long bill option 84. Shapes can also be assigned to anatomical regions such as the tail, head, and eyeline of a bird.

The type of option that is presented when a region is selected by a user is preferably context sensitive (i.e., the presented option is suitable for the type of bird and the specific anatomical region that has been selected). For example, shape is particularly important for bills (for all bird types). Other options such as an eye line option may only be presented for ducks, because eye line is an important anatomical feature only in the context of ducks.

Figure 9:
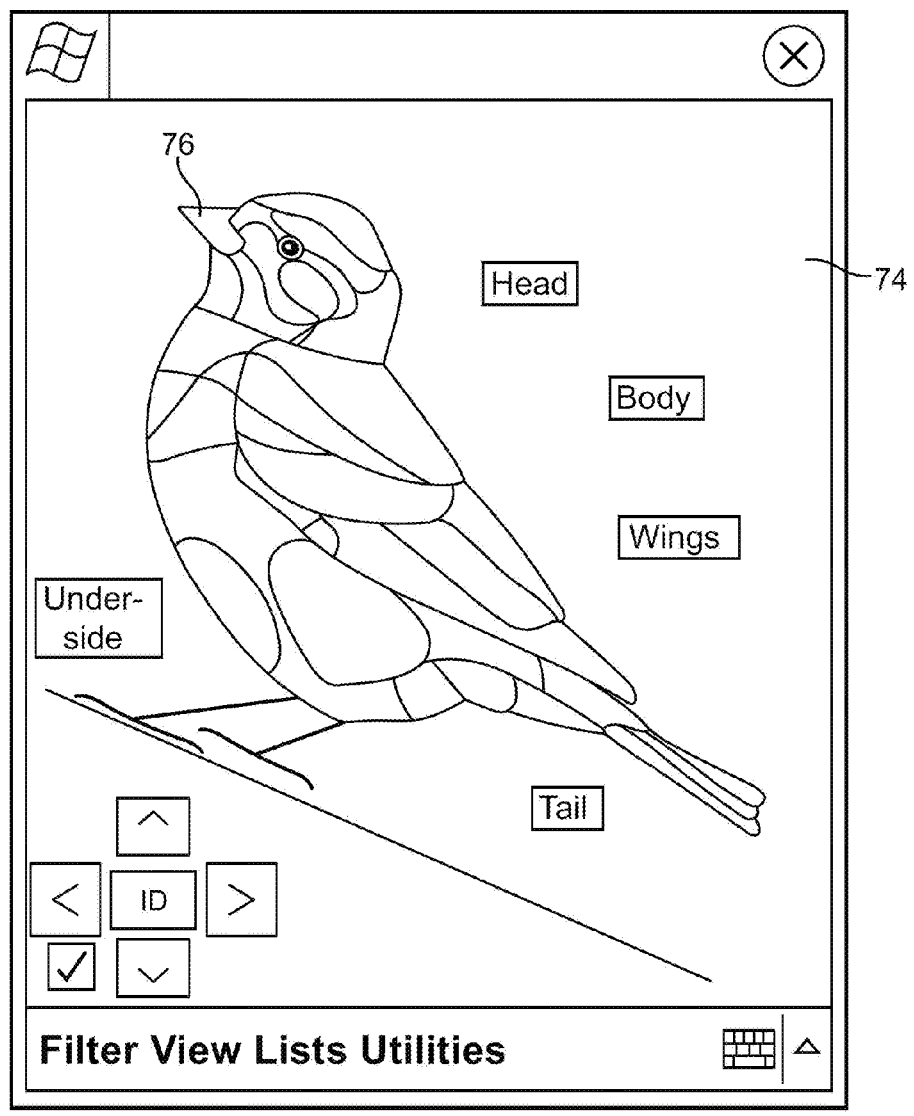
FIG. 9 is a diagram of an illustrative bird body view with interactive anatomical regions in accordance with the present invention.
Figure 12:
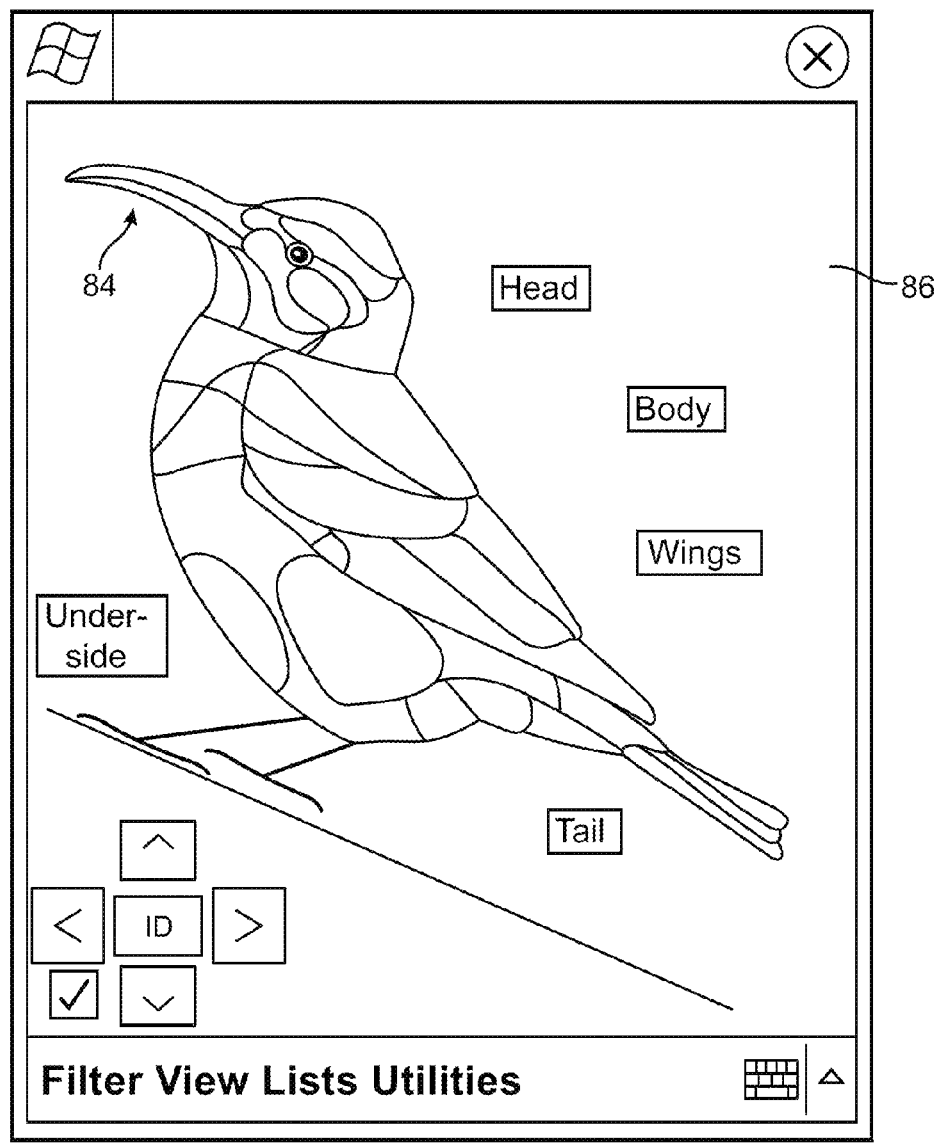
FIG. 12 is a diagram showing an illustrative display screen that may be displayed after a user has selected a desired bill from among the bill options presented on the display screen of FIG. 11 in accordance with the present invention.

If the user selects the long bill 84 in FIG. 11, the bird identification tool replaces the default bill 76 of FIG. 9 with the long bill 84, as shown in screen 86 of FIG. 12. By continually updating the bird view screen 86 with each anatomical attribute selection made by the user, the user is provided with a visual record of the current filter selections that have been made.

Figure 13:
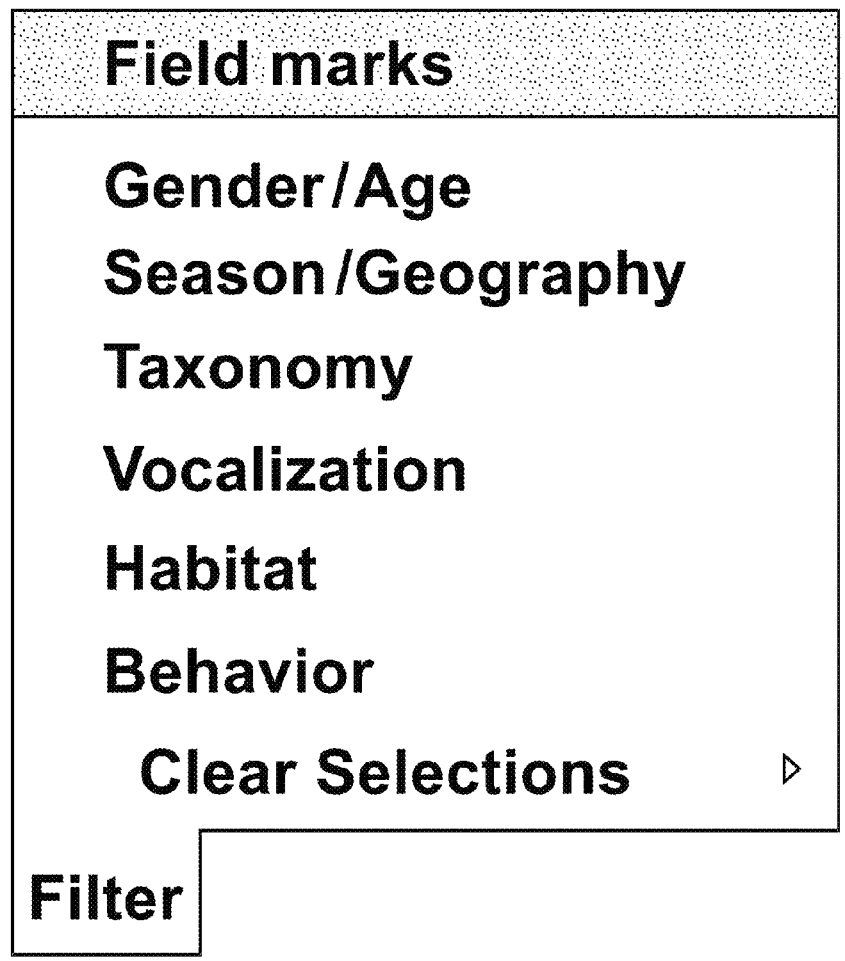
FIG. 13 is a diagram of an illustrative attribute menu that may be used to provide a user of the bird identification tool with an opportunity to select which type of bird identification filter attributes are to be supplied in accordance with the present invention.

The bird identification tool preferably allows users to perform database searches using different types of filter attributes. An illustrative set of filter options that may be provided to the user is shown in FIG. 13. This set of options may be displayed, for example, when the user clicks on filter option 54 (FIG. 3).

The field marks option may be used to access bird views (e.g., FIG. 3). This option allows the user to enter colors, patterns, and shapes for large and small anatomical bird regions. Small regions (sometimes called subregions) may be selected by directly clicking on a region of interest, as described in connection with FIG. 3. Large regions (which are made up of multiple subregions) may be selected by clicking on options such as clickable region label boxes 48 and 50 in FIG. 3.

If the gender/age option is selected, the user may be presented with an opportunity to specify whether the observed bird is male or female and to supply an approximate age.

Figure 14:
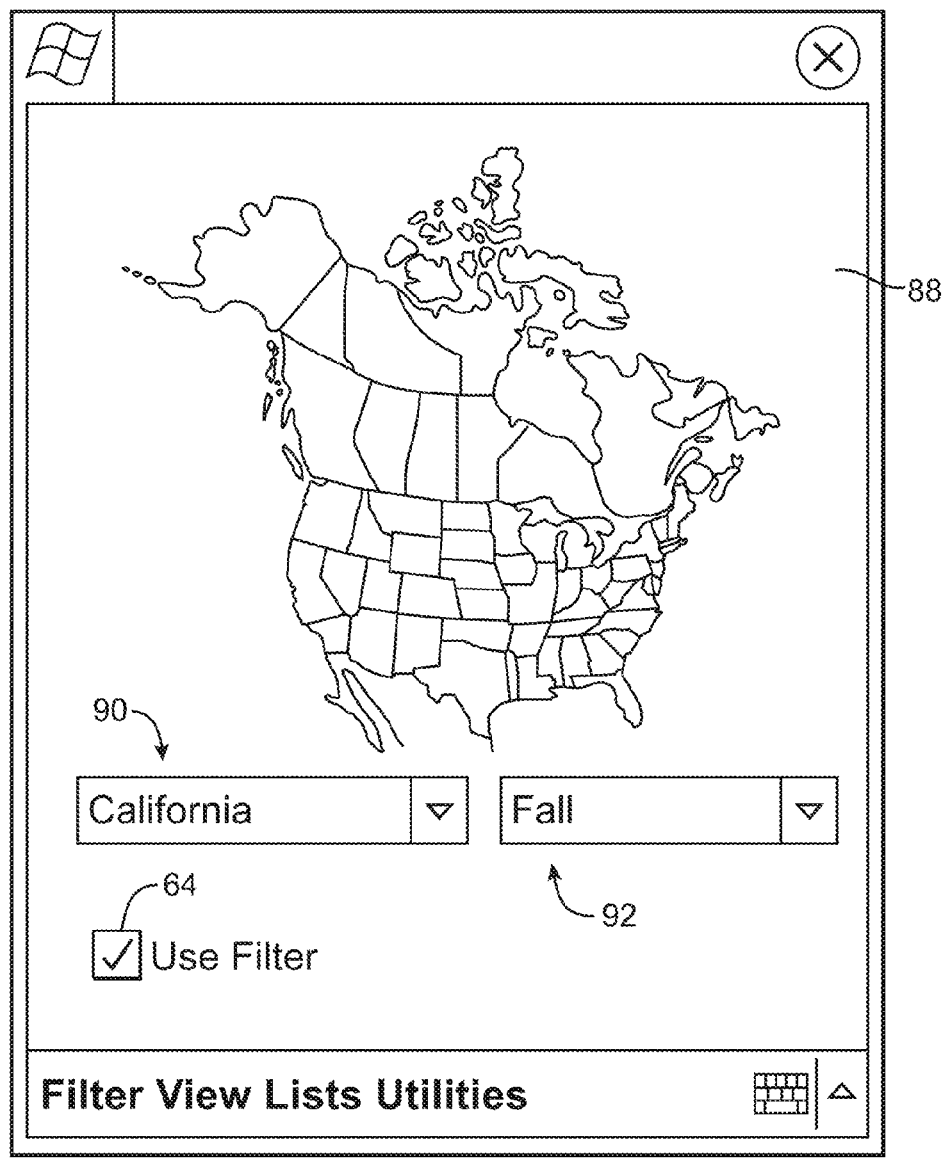
FIG. 14 is a diagram of an illustrative geographic filter attribute entry screen that may be presented using a bird identification tool in accordance with the present invention.

If the season/geography option is selected, the bird identification application may display a season and geographical entry screen such as screen 88 of FIG. 14. Region option 90 and season option 92 may be used to make filter attribute selections. Check box 64 should be checked if the user desires to use the supplied selections during bird database queries.

Figure 15:
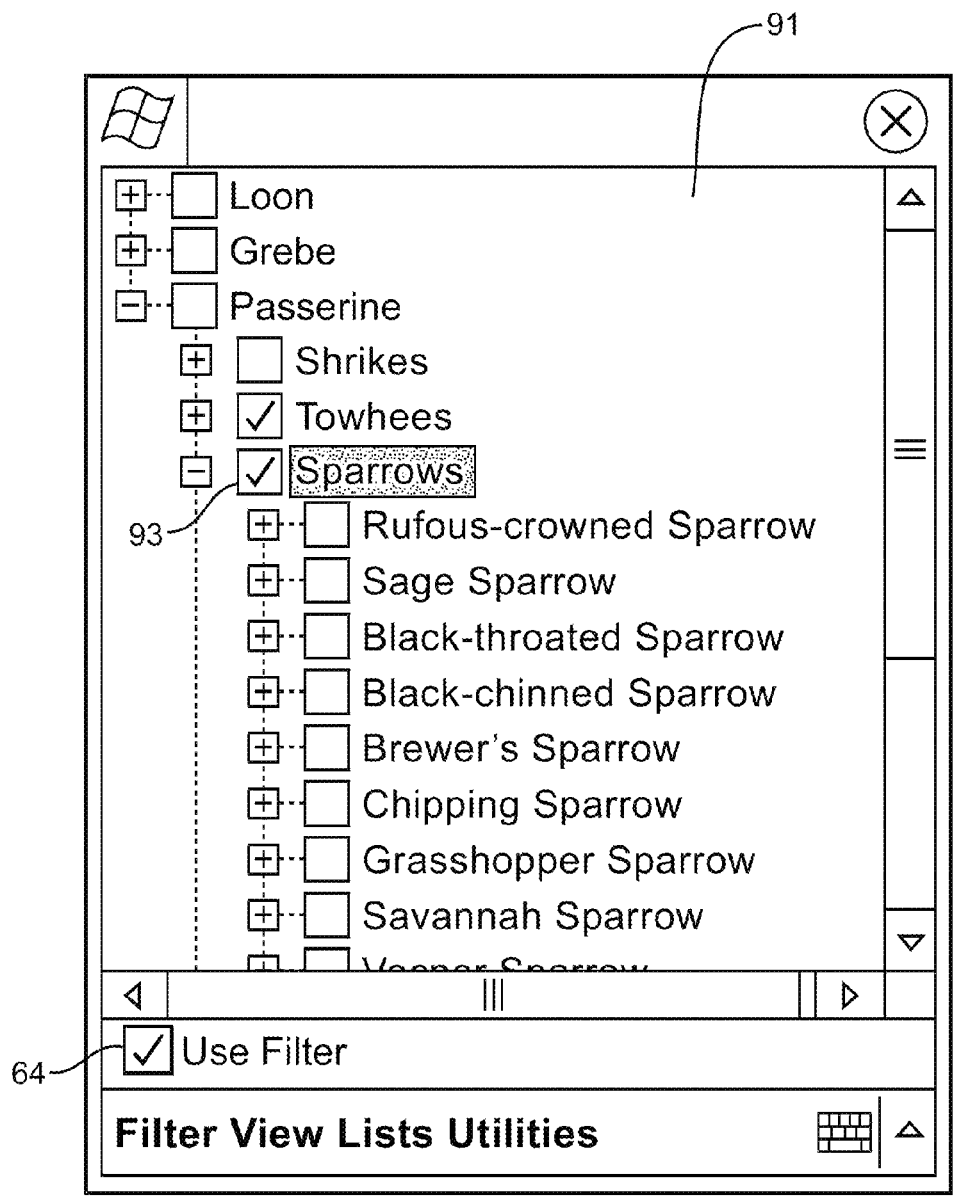
FIG. 15 is a diagram of an illustrative taxonomy information entry screen that may be used to enter taxonomy filter attributes in accordance with the present invention.

If the taxonomy option is displayed, the user may be presented with a taxonomy screen such as screen 91 of FIG. 15. In the taxonomy screen the user is presented with an opportunity to open and close particular branches of a taxonomy tree. The user clicks on boxes that match the user's observations of the bird. For example, if the user believes that the bird in question is a type of sparrow, the user can select sparrow box 93. More narrow selections may be made by clicking on the boxes nested beneath the sparrow box (e.g., Sage sparrow). Taxonomy options such as plumage variations may be represented by boxes nested more deeply. For example, three plumage variations may be nested below the Rufous-crowned sparrow.

If the user selects the vocalization filter option of FIG. 13, the user may be presented with options related to identifying the bird's song. For example, the user may be presented with a screen containing selectable options to characterize the bird's song as long/short, high-pitched/low-pitched, or trill/warble.

If the user selects the habitat filter option of FIG. 13, the bird identification tool may present the user with selectable characteristics related to the bird's habitat (e.g., beach, inland riparian, high mountains, high inland, wetlands, swamp, etc.).

If the user selects the behavior option of FIG. 13, the user may be presented with options that allow the user to specify certain observed behavior characteristics (e.g., dabbling duck, fly catching, carrion feeder).

Filter options for which the user has previously made selections may be marked by placing a check mark adjacent to the appropriate option. The clear selections option of FIG. 13 may be used to clear all previously made selections.

After making all desired filter attribute selections, the user can select view option 56 of FIG. 3. This directs the bird identification tool to perform a database search on database 26 using the selected bird attributes as query terms.

Figure 16:
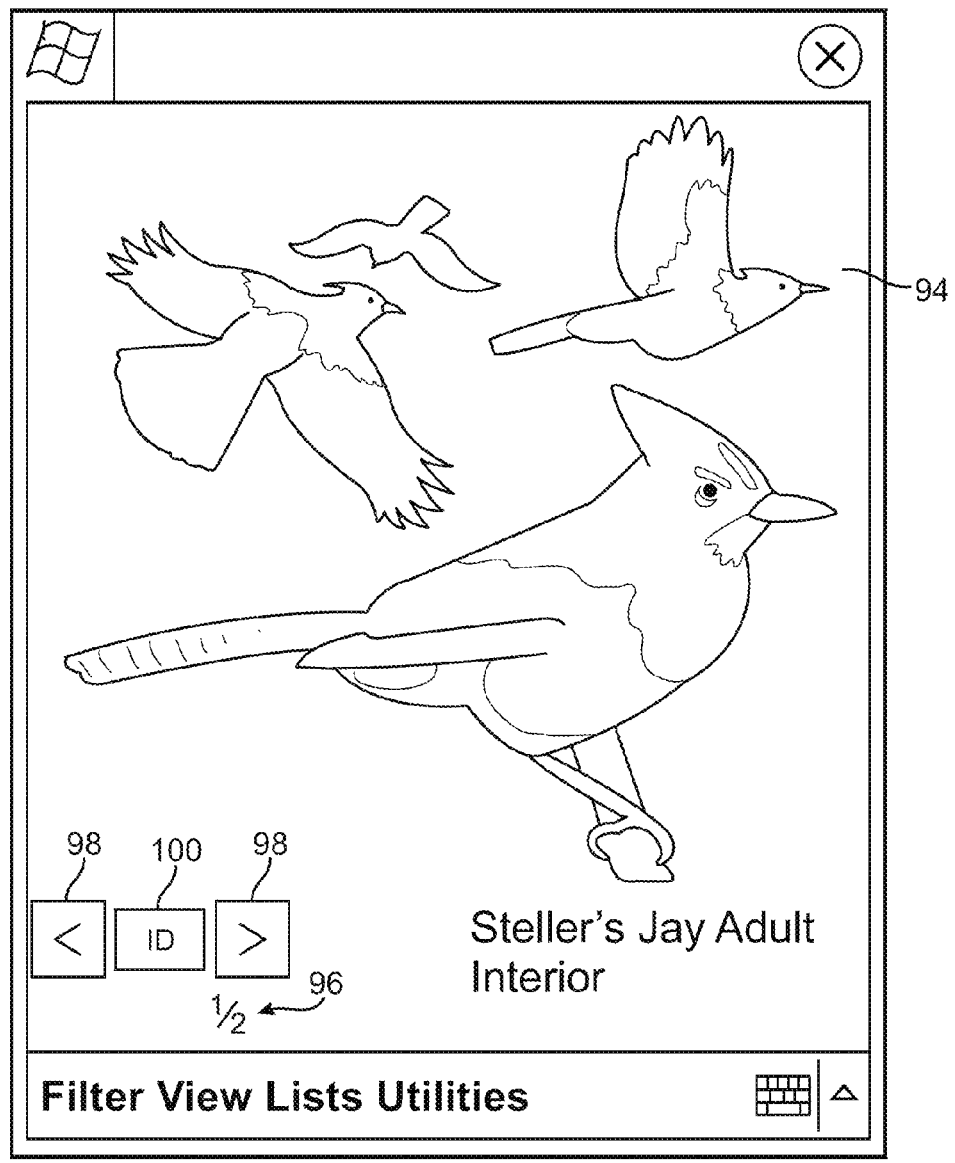
FIG. 16 is an illustrative search results screen that may be presented by the bird identification tool after a user has used a set of bird identification filter attributes to perform a database search in accordance with the present invention.

The type of view option that is selected dictates the format of the displayed search results. With one suitable approach, the user is presented with view options such as "list," "rendered view," and "drawing." If the drawing option is selected, the user is presented with search results using screens such as the results screen 94 of FIG. 16. The current page and total number of hits in the search are indicated numerically in region 96. In the example of FIG. 16, two birds matched the search and the Steller's Jay Adult Interior is the first of these two matches, so the notation in region 96 is "1/2."

Figure 17:
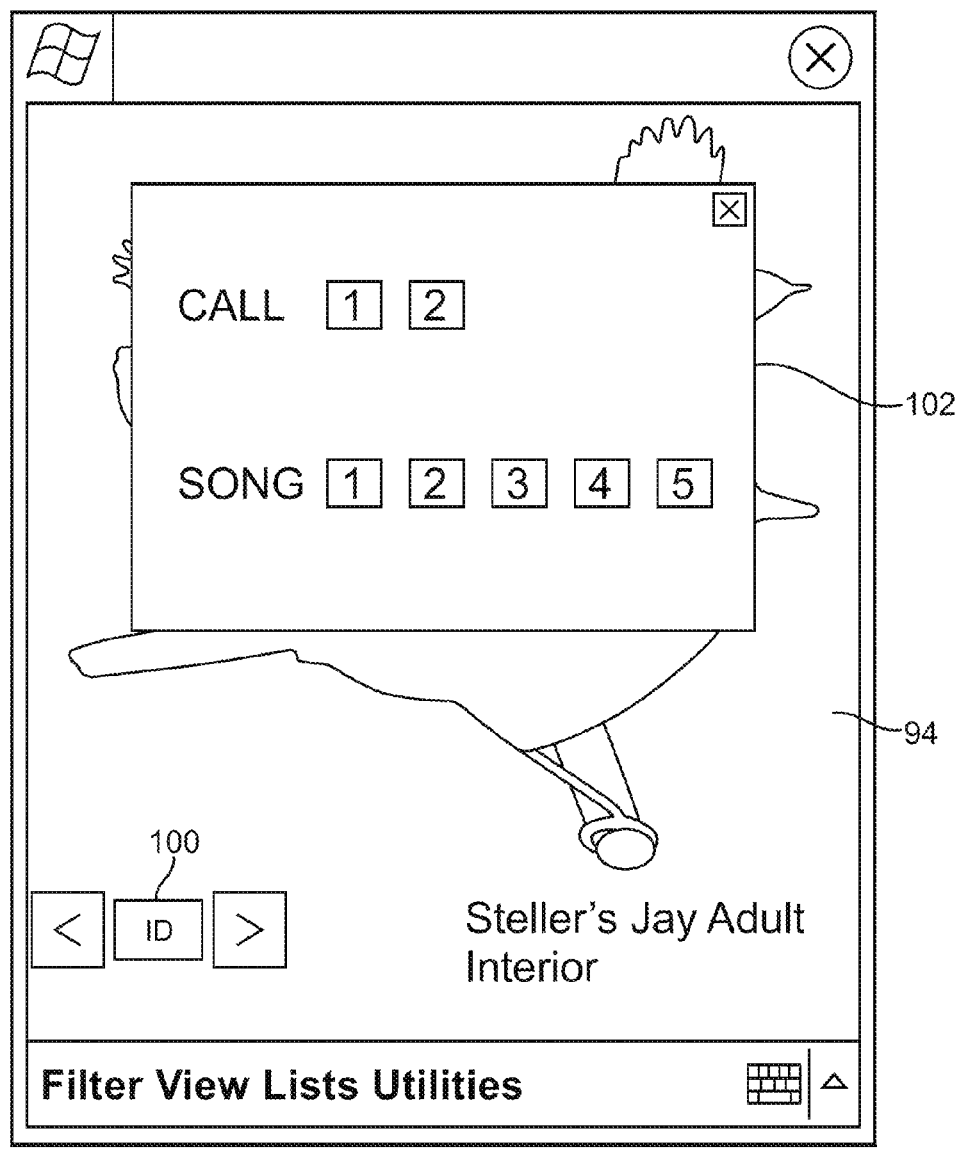
FIG. 17 is a diagram showing an illustrative call and song pop-up window that may be presented to a user of the bird identification tool to provide access to prerecorded audio to assist in a bird identification in accordance with the present invention.

Arrows 98 may be used to navigate through the search results. If the user would like to listen to audio clips of the birds displayed in screen 94, the user can click on screen 94 (as an example). This causes the bird identification application to display window 102 over screen 94, as shown in FIG. 17. The user can click on a desired call or song number in window 102 of FIG. 17. In response, the bird identification tool retrieves the appropriate audio clip 30 and plays it for the user.

When the user believes that the displayed bird is a match with the bird that is being observed in the field, the user clicks on ID button 100.

Figure 18:
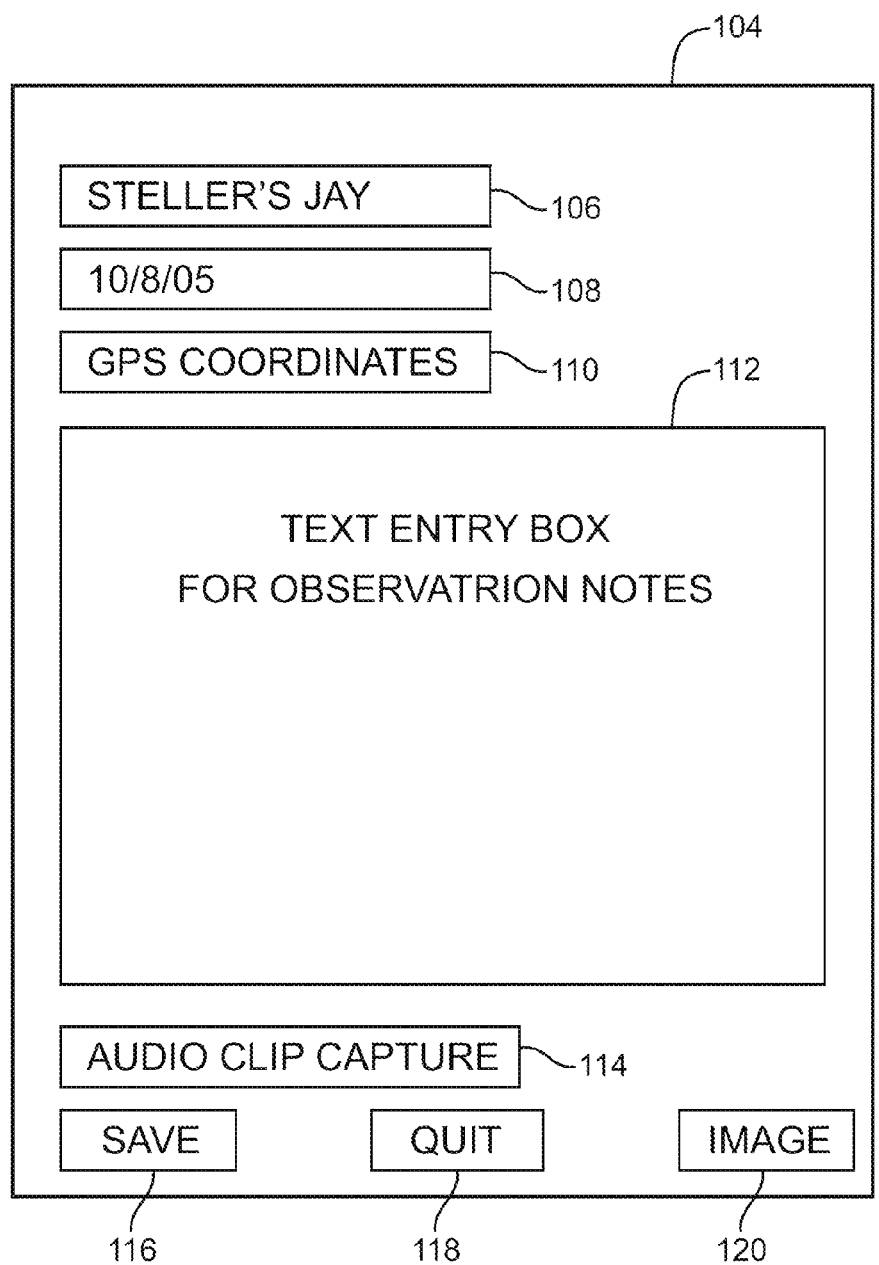
FIG. 18 is an illustrative display screen that the bird identification tool may display when a user has identified a bird and has clicked on a corresponding identification option such as the ID button of FIG. 16 in accordance with the present invention.

In response, the bird identification application displays screen 104 of FIG. 18. Screen 104 preferably includes the bird name 106, the current date 108, and the user's current GPS coordinates 110. Region 112 is used for text entry of field notes. The user can, for example, make notes on the behavior of the bird, the habitat in which the bird was located, the weather, or any other pertinent information regarding the sighting. An audio clip such as an audio clip of the bird's song or voice notes from the user can be captured by clicking on option 114. A digital photograph may be captured by clicking on capture image option 120. Option 116 is used to save the current bird to the user's day list and life list. Option 118 is used to quit screen 104 without adding the bird of screen 104 to the user's lists.

Figure 19:
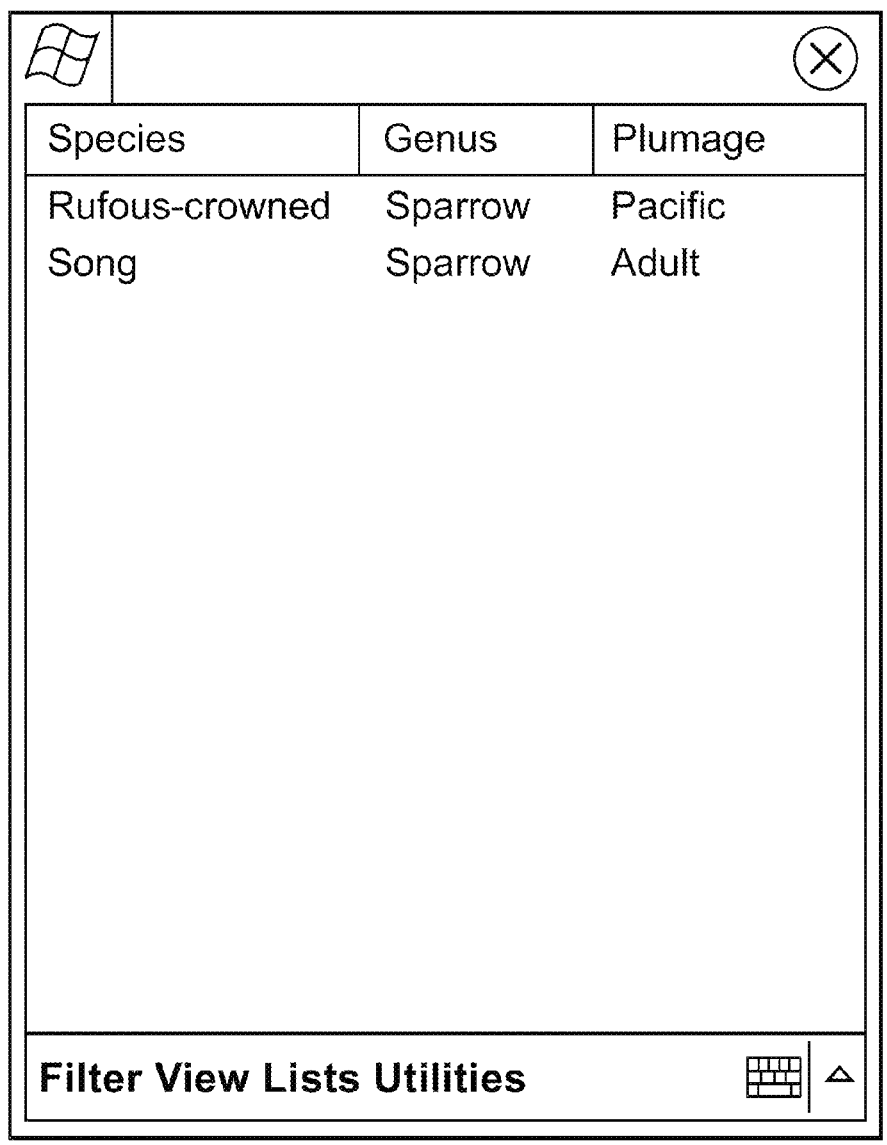
FIG. 19 is a diagram showing how bird database search results may be presented in a list format in accordance with the present invention.

An illustrative list format that may be used to display search results is shown in FIG. 19. In the example of FIG. 19, species information, genus information, and plumage variation information are shown in each row. If the user is interested in viewing more detailed information on a particular bird, the user can double click (tap) on an appropriate row in the displayed search results list. In response, the bird identification tool will display a screen such as screen 94 of FIG. 16.

If the user selects lists option 58 of FIG. 3, the user is presented with an opportunity to view the day list and life list 36 (FIG. 2). An illustrative format that may be used in displaying day list and life list information for the user is shown in FIG. 20. Each row in the day or life list of FIG. 20 may contain information for a different bird. Columns in the list may be used to display information on species, genus, plumage, the date on which the bird was observed, the GPS coordinates of the observation, the geographical location (e.g., the state or country) in which the bird was observed, and observation notes. Observation notes may include text notes entered using region 112 of FIG. 18. The observation notes may also include media content (or links to media content) such as audio clips, digital images, etc. that were captured using options such as option 114 and option 120 of FIG. 18.

Figure 21:
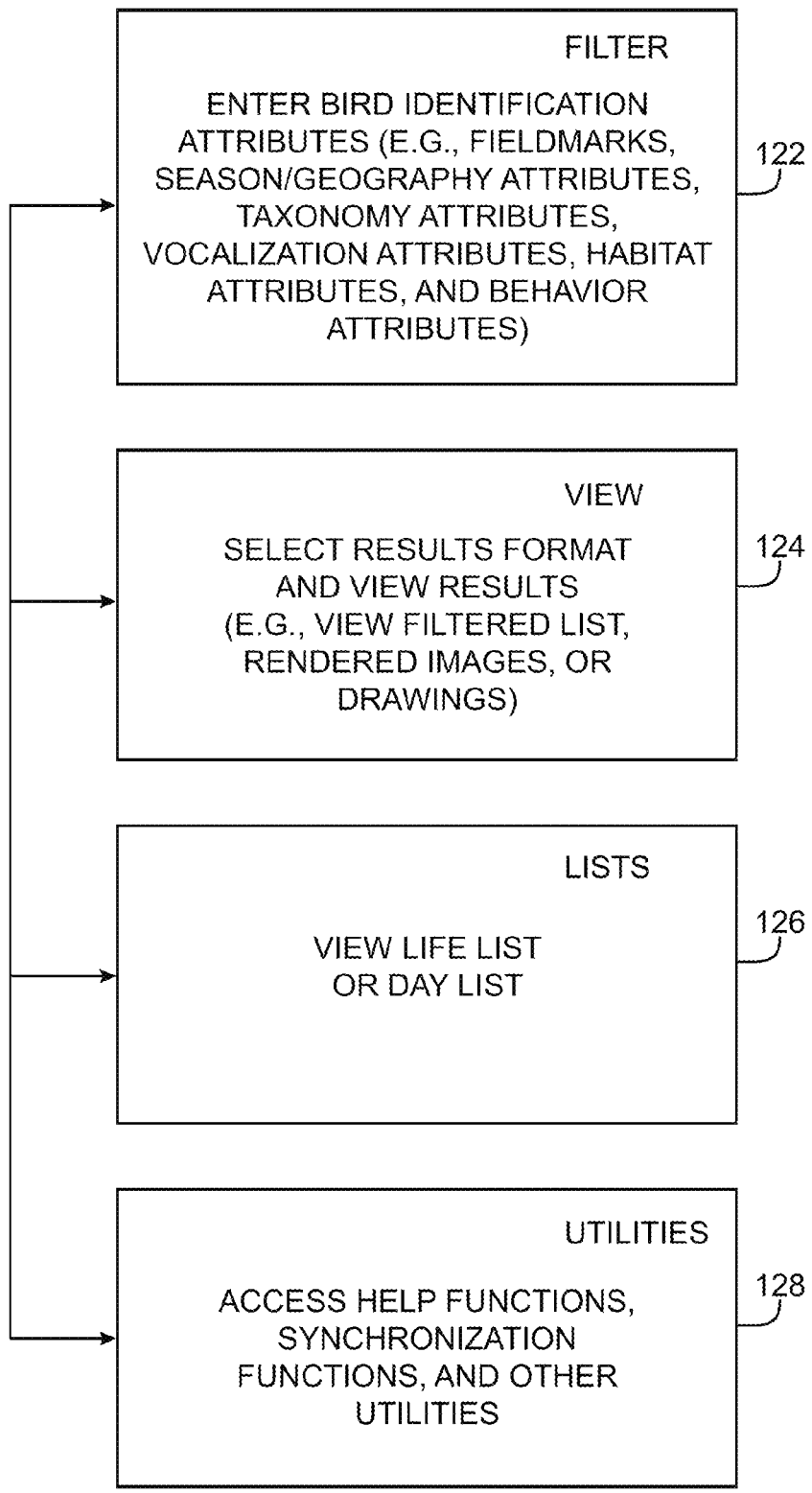
FIG. 21 is a chart of illustrative steps involved in using the bird identification tool to support bird identification and list management functions for a user in accordance with the present invention.

Illustrative steps involved in using the bird identification tool to assist a user in identifying birds observed in the field and in managing notes and other day and life list content are shown in FIG. 21. The operations of steps 122, 124, 126, and 128 may be accessed by using respective options 54, 56, 58, and 60 of FIG. 3. Steps 122, 124, 126, and 128 need not be performed in a particular order. For example, a user can view life list information (step 126) before or after viewing search results (step 124).

During step 122, the interactive graphical capabilities of the bird identification tool such as the anatomical attribute selection screen of FIG. 3 and the other filter options of the bird identification tool are used to enter bird identification attributes. The selected attributes are used as filter criteria in performing a database search (step 124). The database search is typically performed when the user selects a desired view format (e.g., list, rendered image, drawing-type image).

After the search has been performed, the search results are displayed for the user. The user navigates through the search results to determine whether the bird database contains the bird being observed. If the birds in the search results do not match the bird that is being observed, the user can modify the selected set of bird identification filter attributes to broaden the search.

Once the bird has been identified, the user can enter notes on the sighting, capture audio clips and images, and can enter the bird into the user's day list and life list.

During step 128, the bird identification application can be used to perform maintenance tasks such as synchronizing the day list and life list information on the device 10 with comparable information maintained on a personal computer. Help functions and other utilities may also be provided during step 128.

Although described primarily in the context of bird identification, the principles of the invention may be applied to other items found in nature such as rocks, minerals, plants, etc. Accordingly, the foregoing is merely illustrative of the principles of this invention and various modifications can be made by those skilled in the art without departing from the scope and spirit of the invention.

What is claimed is:

1. A method for assisting a user in identifying a bird observed in the field using a bird identification tool implemented on a handheld computing device having a display, comprising:

displaying at least part of a bird that contains a plurality of selectable anatomical regions on the display of the handheld computing device;

constructing a set of bird identification filter attributes based on user input to use in searching a bird identification database to determine which birds likely match the bird being observed in the field;

when the user selects a given one of the plurality of selectable anatomical regions, displaying on-screen options on the display with which the user interacts to assign an appearance characteristic to the given anatomical region, wherein the given anatomical region with the assigned appearance characteristic forms one of the set of bird identification filter attributes;

updating the displayed plurality of selectable anatomical regions when the given one of the selectable anatomical regions is selected to provide the user with a visual record of current bird identification filter attributes that have been selected;

searching the bird identification database using the bird identification filter attributes; and presenting corresponding search results to the user on the display of the handheld computing device, wherein the search results contain images of birds that match the bird identification filter attributes.

2. The method defined in claim 1 wherein displaying said at least part of the bird comprises displaying a body view of a bird.

3. The method defined in claim 1 wherein displaying said at least part of the bird comprises selectively displaying an underwing view of a bird and a body view of a bird.

4. The method defined in claim 1 wherein displaying said at least part of the bird comprises providing the user with an opportunity to selectively display a head view of a bird, an underwing view of a bird, and a body view of a bird.

5. The method defined in claim 1 further comprising displaying on-screen options that allow the user to make a bird type selection for the displayed bird view, wherein the bird type selection comprises selection of a bird type including at least the types land bird, shore bird, and bird of prey.

6. The method defined in claim 1 wherein displaying said at least part of the bird comprises displaying a body view of a bird, wherein the body view comprises some anatomical regions that are directly selected and some anatomical regions that are selected by clicking on adjacent anatomical region labels.

7. The method defined in claim 1 wherein displaying said at least part of the bird comprises displaying a body view of a bird, wherein the body view comprises some anatomical regions that are directly selected and some anatomical regions that are selected by clicking on adjacent anatomical region labels, the method further comprising:

displaying on-screen arrows that are used to select a bird type for the displayed bird view.

8. The method defined in claim 1 further comprising:

in response to user input, capturing an audio clip of the observed bird with the bird identification tool.

9. The method defined in claim 1 further comprising:

using the bird identification tool to add one of the birds in the search results to a life list of the user.

10. The method defined in claim 1 further comprising:

using the bird identification tool to play back a bird call associated with one of the birds in the search results.

11. The method defined in claim 1 further comprising:

allowing the user to assign a geographical region as one of the set of bird identification filter attributes using the bird identification tool.

12. The method defined in claim 1 further comprising:

using the bird identification tool to allow the user to select a geographical region as one of the set of bird identification filter attributes.

13. The method defined in claim 1 further comprising:

storing captured images and captured songs of birds in a list database maintained on the handheld computing device.

14. The method defined in claim 1 further comprising:

maintaining information in the bird identification database in the form of a bird table containing rows and columns, wherein each column of the bird table contains information for a different bird plumage variation.

15. The method defined in claim 1 further comprising:

using the bird identification tool to display interactive horizontal and vertical arrows on the display, wherein when said at least part of the bird is displayed on the display, the user clicks on the horizontal arrows to select between different bird types for the displayed bird view and clicks on the vertical arrows to select which bird anatomical regions are included in the displayed bird view.

16. The method defined in claim 1 wherein displaying on-screen options on the display with which the user interacts to assign an appearance characteristic to the given anatomical region comprises displaying an on-screen color option with which the user assigns a particular color to the given anatomical region.

17. The method defined in claim 1 wherein displaying on-screen options on the display with which the user interacts to assign an appearance characteristic to the given anatomical region comprises displaying an on-screen pattern option with which the user assigns a particular pattern to the given anatomical region.

18. The method defined in claim 1 wherein displaying on-screen options on the display with which the user interacts to assign an appearance characteristic to the given anatomical region comprises displaying an on-screen shape option with which the user assigns a particular shape to use as one of the filter attributes.

19. The method defined in claim 1 further comprising displaying on-screen options with the bird identification tool with which the user supplies bird identification filter attributes including gender attributes, age attributes, season attributes, taxonomy attributes, and vocalization attributes.

20. The method defined in claim 1 further comprising:

displaying on-screen options with the bird identification tool with which the user supplies bird identification filter attributes including gender attributes, age attributes, season attributes, taxonomy attributes, vocalization attributes, habitat attributes, and behavior attributes; and displaying a text entry box on the display into which the user enters observation notes; and displaying an audio clip capture option that the user clicks to capture an audio clip of an observed bird in the field.

* * * * *